United States Patent
Martins et al.

(10) Patent No.: US 6,404,812 B1
(45) Date of Patent: Jun. 11, 2002

(54) METHOD AND APPARATUS FOR CONTROLLING VIDEO ENCODER OUTPUT BIT RATE USING PROGRESSIVE RE-QUANTIZATION

(75) Inventors: Fernando C. M. Martins, Hillsboro; Brian R. Nickerson, Aloha, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/156,571

(22) Filed: Sep. 17, 1998

(51) Int. Cl.[7] .................................. H04N 7/30
(52) U.S. Cl. ...................... 375/240.05; 375/240.08; 382/243; 382/251
(58) Field of Search ................ 348/405; 375/240.03, 375/240.04, 240.05, 240.08; 382/243, 251; H04N 7/30

(56) References Cited

U.S. PATENT DOCUMENTS 5,745,178 A * 4/1998 Hartung et al. ........ 375/240.04

* cited by examiner

*Primary Examiner*—Howard Britton
(74) *Attorney, Agent, or Firm*—Blakely, Sokoloff, Taylor & Zafman LLP

(57) ABSTRACT

A method for processing image data includes quantizing a region in a frame with an initial quantizer level. It is determined whether an amount of bits required for encoding the region after quantizing the region with the initial quantizer level is within a bit allocation budget. The region is re-quantized if the amount of bits is not within the bit allocation budget.

8 Claims, 7 Drawing Sheets

| B1 T1 451 | B2 T2 452 | | B6 T6 456 | B9 T9 459 | B12 T12 462 |
| | B3 T3 453 | | | B8 T8 458 | B11 T11 461 |
| | | B5 T5 455 | | | |
| | | B4 T4 454 | B7 T7 457 | | B10 T10 460 |

METHOD AND APPARATUS FOR CONTROLLING VIDEO ENCODER OUTPUT BIT RATE USING PROGRESSIVE RE-QUANTIZATION

FIELD OF THE INVENTION

The present invention relates to the field of digital image processing. More specifically, the present invention relates to a method and apparatus for controlling video encoder output bit rate using progressive re-quantization.

BACKGROUND OF THE INVENTION

Interframe video encoding systems predict a current frame from a previously reconstructed frame and perform quantization on the residual between the previous frame on a region-by-region basis. For example, in the Moving Pictures Experts Group 2 (MPEG-2) Video Compression Standard, published 1994, macroblocks of 16×16 pixels are predicted and the residual of the macroblocks are encoded. If a particular data rate is required for the transmission of the encoded bitstream within a bandlimited channel, data rate control is employed to encode each frame according to a specific bit allocation budget. A coding control unit is a component of the video encoder that is responsible for managing the tradeoff between the perceived video quality (spatial and temporal) of an encoded bitstream and the bandwidth required by the encoded bitstream. In practice, video is captured at a given frame rate F (frames per second), encoded, and transmitted over a channel of bandwidth B (bits per second). The coding control unit modulates video quality to ensure that the channel utilization stays within the available bandwidth B. Video quality is modulated spatially by choosing coarse or fine quantizers at encode time or temporally by selectively dropping encoded frames.

When the encoder misses the target frame size and uses too many bits to encode individual frames, output buffer overflow occurs. When output buffer overflow occurs, the encoder must modulate video quality temporally by dropping frames. Temporal modulation of video quality is typically undesirable because it results in jerkiness in the perceived video. To avoid frame skipping induced by buffer overflow, a rate control strategy must modulate spatial quality precisely and chooses quantizer levels that lead to buffer utilization on a per frame basis to meet the target frame size R=B/F (bits per frame).

SUMMARY OF THE INVENTION

A method for processing image data is disclosed. A region in a frame is quantized with an initial quantizer level. It is determined whether an amount of bits required for encoding the region after quantizing the region with the initial quantizer level is within a bit allocation budget. The region is re-quantized if the amount of bits is not within the bit allocation budget.

BRIEF DESCRIPTION OF THE DRAWINGS

The present invention is illustrated by way of example and not by way of limitation in the figures of the accompanying drawings, in which the like references indicate similar elements in and in which:

FIG. 5 illustrates a tessellated frame of image dated with a bit allocation budget according to an embodiment of the present invention;

DETAILED DESCRIPTION

Figure 1:
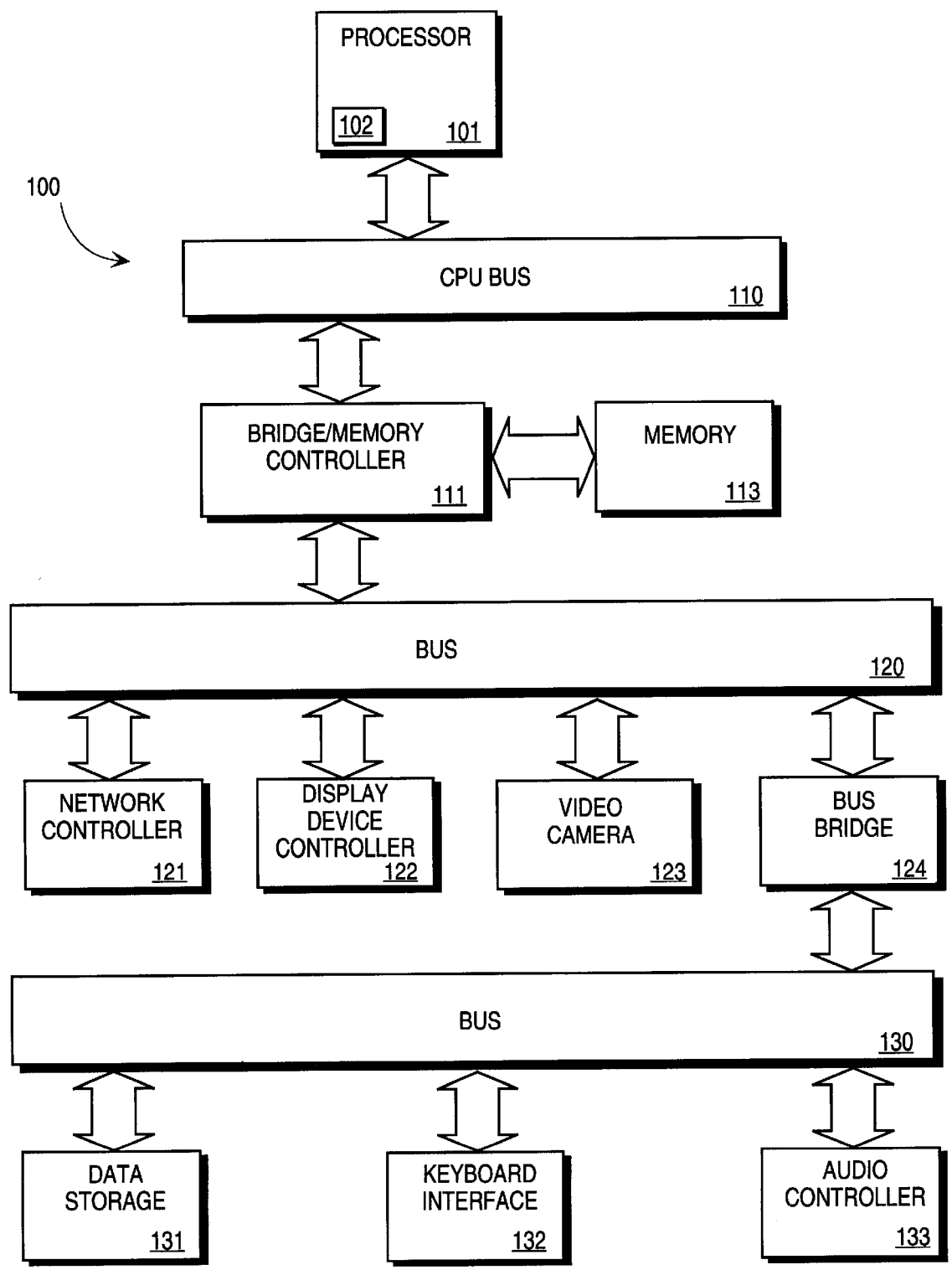
FIG. 1 is a block diagram of a computer system implementing an embodiment of the present invention.

Referring to FIG. 1, a computer system upon which an embodiment of the present invention can be implemented is shown as 100. The computer system 100 includes a processor 101 that processes data signals. The processor 101 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 that transmits data signals between processor 101 and other components in the computer system 100.

The computer system 100 includes a memory 113. The memory 113 may be a dynamic random access memory (DRAM) device, a static random access memory (SRAM) device, or other memory device. The memory 113 may store instructions and code represented by data signals that may be executed by the processor 101. A cache memory 102 resides inside processor 101 that stores data signals stored in memory 113. The cache 102 speeds up memory accesses by the processor 101 by taking advantage of its locality of access. In an alternate embodiment of the computer system 100, the cache 102 resides external to the processor 101.

A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 is coupled to the first I/O bus 120. The network controller 121 links the computer system 100 to a network of computers (not shown in FIG. 1) and supports communication among the machines. A display device controller 122 is coupled to the first I/O bus 120. The display device controller 122 allows coupling of a display device to the computer system 100 and acts as an interface between the display device and the computer system 100. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 101 through the display device controller 122 and displays the information and data signals to the user of the computer system 100. A video camera 123 is coupled to the first I/O bus 120. The video camera 123 operates to capture an image of an object. The video camera 123 may be a digital video camera having internal digital video capture hardware that translates the captured image into image data. The video camera 123 may be an analog video camera having digital video capture hardware external to the video camera 123 that digitized the captured image into image data.

A second I/O bus 130 may be a single bus or a combination of multiple buses. As an example, the second I/O bus 130 may comprise a PCI bus, a PCMCIA bus, a NuBus, an Industry Standard Architecture (ISA) bus, or other buses. The second I/O bus 130 provides communication links between components in the computer system 100. A data storage device 131 is coupled to the second I/O bus 130. The data storage device 131 may be a hard disk drive, a floppy disk drive, a CD-ROM device, a flash memory device or other mass storage device. A keyboard interface 132 is coupled to the second I/O bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard to the computer system 100 and transmits data signals from a keyboard to the computer system 100. An audio controller 133 is coupled to the second I/O bus 130. The audio controller 133 operates to coordinate the recording and playing of sounds is also coupled to the I/O bus 130.

A bus bridge 124 couples the first I/O bus 120 to the second I/O bus 130. The bus bridge 124 operates to buffer and bridge data signals between the first I/O bus 120 and the second I/O bus 130.

The present invention is related to the use of the computer system 100 to process image data. According to one embodiment, processing image data is performed by the computer system 100 in response to the processor 101 executing a sequence of instructions in main memory 113. Such instructions may be read into memory 113 from another computer-readable medium, such as data storage device 131, or from another source via the network controller 121. Execution of the sequence of instructions causes the processor 101 to encode video data, as will be described hereafter. In an alternate embodiment, hardwired circuitry may be used in place of or in combination with software instructions to implement the present invention. Thus, the present invention is not limited to any specific combination of hardware circuitry and software.

Figure 2:
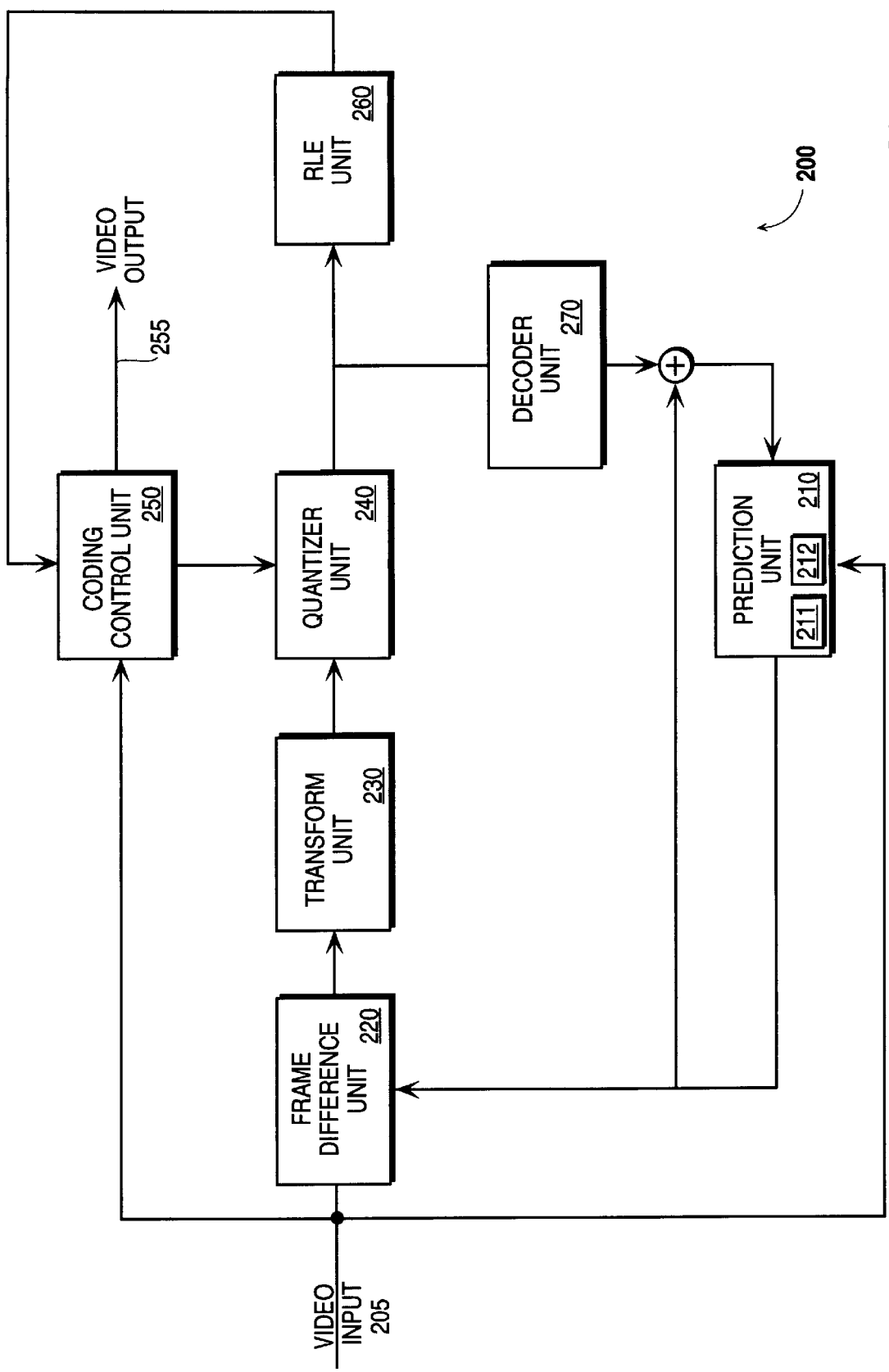
FIG. 2 is a block diagram of video encoder according to an embodiment of the present invention.

FIG. 2 is a block diagram of a video coder 200 according to an embodiment of the present invention. In a preferred embodiment of the present invention, the video coder 200 is implemented by software and resides in main memory 113 (shown in FIG. 1) as a sequence of instructions. It should be appreciated that the video coder 200 may also be implemented by hardware as components coupled to the bus 120 (shown in FIG. 1) or a combination of both hardware and software. Block 210 represents a prediction unit. The prediction unit 210 receives image data of a present frame to be encoded from a video input 205. The prediction unit 210 includes a motion estimation unit 211. The motion estimation unit 211 analyzes regions of a present frame to be encoded and regions of a frame previously received to be encoded and generates motion vectors that define how images in the frame previously received are to be displaced in order to generate the regions of the present frame. The prediction unit 210 includes a motion compensation unit 212. The motion compensation unit 212 receives the motion vectors for the regions of the present frame and generates a prediction frame using the frame previously received.

A frame difference unit 220 is coupled to the prediction unit 210 and the video input 205. The frame difference unit 210 receives image data of the present frame to be encoded from the video input 205 and the prediction frame from the prediction unit 210. The frame difference unit 220 generates a residual frame that describes the difference between the prediction frame and the present frame to be encoded.

A transform unit 230 is coupled to the frame difference unit 220. The transform unit 230 receives the residual frame from the frame difference unit 220 and transforms data in the residual frame from a time domain to a frequency domain to generate a transformed residual frame. According to an embodiment of the transform unit 236, the transform unit 230 performs a discrete cosine transform (DCT) on the residual frame. It should be appreciated that the transform unit 230 may perform a discrete Fourier transform, a discrete wavelet transform, or other type of time to frequency transform.

A coding control unit 250 is coupled to the video input 205. The coding control unit 250 receives frames to be encoded from the video input 205 including the present frame and the frame previously received. The coding control unit 250 determines a degree of interest to encode areas in the frames received. The coding control unit 250 generates a bit allocation budget for encoding the transformed residual frame according to the degrees of interests. The coding control unit 250 selects the quantizer levels used to quantize the regions of the transformed residual frame such that the amount of bits used to encode the regions meet the bit allocation budget.

A quantizer unit 240 is coupled to the transform unit 230 and the coding control unit 250. The quantizer unit 240 receives the transformed residual frame from the transform unit 230 and the quantizer levels for quantizing the regions in the transformed residual frame. The quantizer unit 240 quantizes the non-zero transform coefficients of each region of the transformed residual frame using the quantizer levels selected by the coding control unit 250. According to an embodiment of the present invention, the quantizer unit 240 performs lossy compression on the transformed residual frame.

A run length encoding (RLE) unit 260 is coupled to the quantizer unit 240. The RLE unit 260 receives the transformed residual frame that has been quantized and performs run length encoding to further compress the information in the transformed residual frame that has been quantized. According to an embodiment of the present invention, the RLE unit 260 performs lossless compression on the transformed residual frame that has been quantized.

The coding control unit 250 receives the encoded frame from the RLE unit 260 and determines the actual number of bits required to encode each region of the encoded frame. If the amount of bits required for encoding each region of encoded frame is within the bit allocation budget, the encoded frame is transmitted from the coding control unit 250 to the video output 255 and the encoded frame is transmitted from the quantizer unit 240 to the decoder unit 270. If the amount of bits required for encoding a region of the encoded frame is outside the bit allocation budget, the coding control unit 250 selects a coarser or finer quantizer level to quantize the over or under budgeted region of the transformed residual frame. The over or under budgeted region is re-quantized by the quantizer unit 240 and re-encoded by the RLE unit 260 and transmitted back to the coding control unit 250 to determine whether the amount of bits required to encode the region is within the bit allocation budget. This process is repeated where further re-quantization is performed by the quantizer unit 240 using other quantizer levels selected by the coding control unit 250 until the amount of bits required to encode the region is within the bit allocation budget or until an allocated amount of time for re-quantization expires.

The decoder unit 270 receives the encoded frame from the quantizer unit 240. The decoder unit 270 performs a reverse quantization operation and reverse transform operation on the residual frame received from the quantizer unit 240 to re-generate the residual frame. The residual frame is summed with the prediction frame of the present frame to re-generate the present frame and transmitted to the prediction unit 210. The re-generated present frame is transmitted to the prediction unit 210 where it is used to generate a prediction frame for a subsequent frame to be encoded.

The prediction unit 210, frame difference unit 220, transform unit 230, quantizer unit 240, coding control unit 250, RLE unit 260, and decoder unit 270 may be implemented by using any known circuitry or technique. In an embodiment of the present invention where the encoder unit 200 is implemented in hardware, the prediction unit 210, frame difference unit 220, transform unit 230, quantizer unit 240, coding control unit 250, RLE unit 260, and decoder unit 270 all reside on a single semiconductor substrate.

Figure 3:
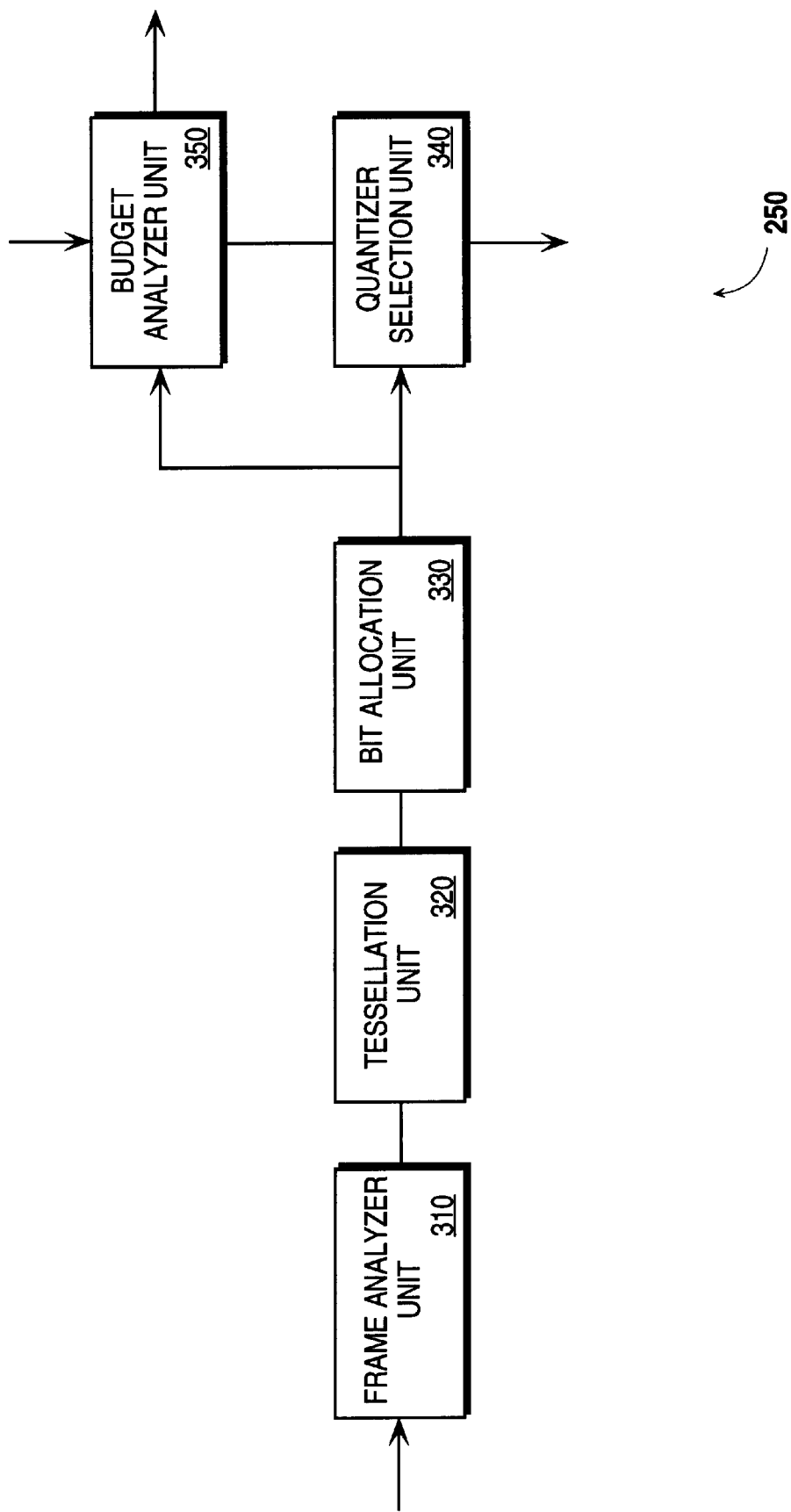
FIG. 3 is a block diagram of a coding control unit according to an embodiment of the present invention.

FIG. 3 is a block diagram of a coding control unit 250 according to an embodiment of the present invention. The coding control unit 250 includes a frame analyzer unit 310. The frame analyzer unit 310 receives frames to be encoded from the video input 205 (shown in FIG. 2). The frame analyzer unit 310 generates resolution data that indicates a degree of interest that areas in a present frame should be encoded with. The frame analyzer unit 310 may analyze the frames for areas that include motion activity and indicate that those areas should be encoded to have a high degree of interest. Alternatively, the frame analyzer unit 310 may receive programmed preferences from an operator indicating areas in a frame that should be encoded to have a degree of interest. It should be appreciated that the frame analyzer unit 310 may determine a degree of interest to encode areas in a present frame through analyzing for motion activity and receiving programmed preferences. The frame analyzer unit 310may rank the areas in the present frame according to the degree of interest that the areas should be encoded. Alternatively, the frame analyzer unit 310 may designate a level of interest to encode each of the areas.

A tessellation unit 320 is coupled to the frame analyzer unit 310. The tessellation unit 320 receives the frame to be encoded and the resolution data from the frame analyzer unit 310. The tessellation unit 320 tessellates the frame to be encoded into regions according to the resolution data such that the degree of interest that each region should be encoded is the same. According to an embodiment of the present invention, a region or "image chunk" may be defined as a set of neighboring macroblocks to be quantized with a constant quantizer. A row of macroblocks or a rectangular region whose borders are at macroblock boundaries can be a region.

Figure 4:
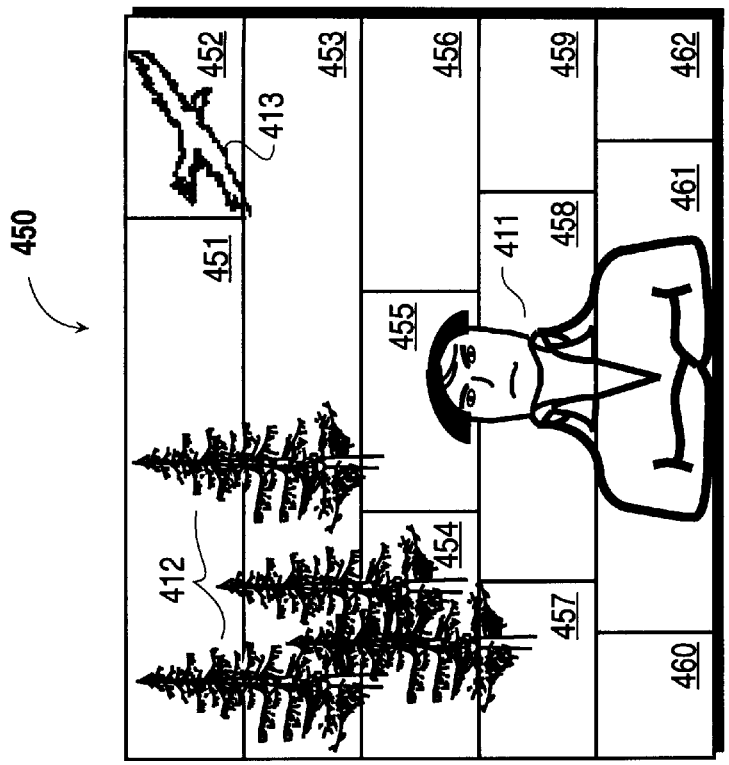
FIG. 4 illustrates a tessellated frame of image data according to an embodiment of the present invention.
Figure 4:
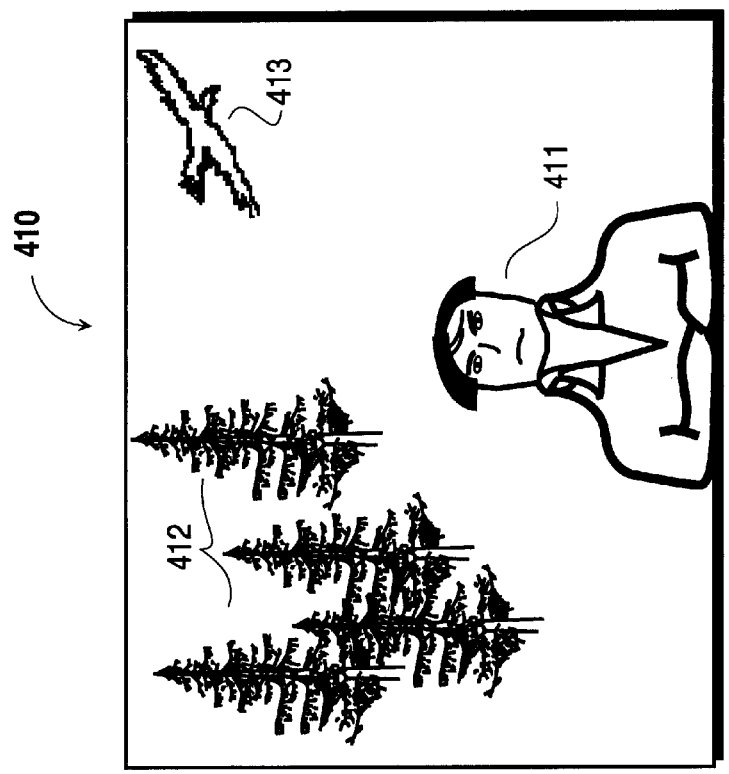

FIG. 4 illustrates a tessellated frame of image data according to an embodiment of the present invention. Frame 410 includes image data of a frame to be encoded. The frame to be encoded 410 includes an image of a person 411, and landscape 412 and a bird 413 in the background. The frame analyzer unit 310 (shown in FIG. 3) generates resolution data that indicates that the image of the person 411 and the bird 413 should be encoded with a high degree of interest while the stationary landscape 412 and other background in the frame 410 should be encoded with a low degree of interest. The tessellation unit 320 (shown in FIG. 3) generates a tessellated frame 450 that corresponds to the frame to be encoded 410 having tessellated regions 451–462. Each tessellated region includes images to be quantized with a same quantizer level. Regions 455, 458, and 461 correspond to the image of the person 411. Region 452 corresponds to the image of the bird 413. Regions 451, 453, 453, 456, 457, 459, 460, and 462 correspond to the image of the landscape and background.

Referring back to FIG. 3, a bit allocation unit 330 is coupled to the tessellation unit 320. The bit allocation unit 330 receives the tessellated frame and the resolution data from the tessellation unit 320. The bit allocation unit 330 generates a bit allocation budget for encoding each region in the tessellated frame according to the resolution data.

FIG. 5 illustrates a bit allocation budget generated for the tessellated frame 450. Each of the regions 451–462 is assigned a bit allocation budget B1–B12. The bit allocation budget B2, B5, B8, and B11 will be relatively higher in terms of bits per macroblock compared to the bit allocation budget B1, B3, B4, B6, B7, B9, B10, an B12 in order to provide a higher degree of interest to regions 452, 455, 458, and 461. The sum of the bit allocation budget (B1–B12) assigned to the regions 451–462 equals the target frame size for the frame to be encoded 410 (shown in FIG. 4). Also assigned to each region 451–462 of the tessellated frame 450 is a time allocation budget (T1–T12). The time allocation budget indicates an amount of time that may be used by the quantizer unit 240 (shown in FIG. 2) to quantize or re-quantize each of the regions 451–462.

Referring back to FIG. 3, a quantizer selection unit 340 is coupled to the bit allocation unit 330. The quantizer selection unit 340 receives the bit allocation budget and time allocation budget for each region in the tessellated frame 450. The quantizer selection unit 340 selects a quantizer level to quantize each of the regions according to the bit allocation budget and the size of the region. The selected quantizer level is sent to the quantizer unit 240.

A budget analyzer unit 350 is coupled to the bit allocation unit 330 and the quantizer selection unit 340. The budget analyzer unit 350 receives regions of the transformed residual frame that has been quantized from the RLE unit 260 (shown in FIG. 2) and the bit allocation budget and time allocation budget from the bit allocation unit 330. The budget analyzer unit 350 determines the amount of bits required to encode a region of the transformed residual frame that has been quantized. If the amount of bits required for encoding a region of the transformed residual frame that has been quantized is within its bit allocation budget or if the time allocated to quantize the region has expired, the budget analyzer unit 350 proceeds in analyzing the bits required for encoding a next region. If the amount of bits required for encoding a region of the transform residual frame that has been quantized is outside its bit allocation budget and the time allocated to quantize the region has not expired, the budget analyzer 350 unit 250 generates a re-quantized message to the quantization unit. The re-quantize message includes information regarding the identity of the region that requires re-quantization and the amount of bits the region was over-budgeted by using the prior quantizer level selected by the quantizer selection unit 340.

According to an embodiment of the present invention, the quantizer selection unit 340 selects an initial quantizer that produces a high quality image for a region that will likely require more bits in the bitstream than the budgeted in the bit allocation budget. If the encoded region requires an amount of bits that exceeds the bit allocation budget, a coarser quantizer level is selected. Conversely, if the encoded region requires an amount of bits that is considerably less than the allocated budget, a finer quantizer is selected. The quantizer selection unit 340 selects a quantizer level to re-quantize the over-budget or under-budget region based on the information in the re-quantize message. The selection of a quantizer level is not necessarily performed by selecting the very next quantizer level that generates resolution that is coarser or finer in degree then the previously selected quantizer level. Instead, selection of a quantizer level may be achieved by the quantizer selection unit 340 through the use of a dynamic table created either from historical data or from a dynamic source model. According to an embodiment of the present invention, re-quantization from a fine level to a coarse level requires reprocessing only the coefficients not quantized to zero. Coefficients that have been quantized to zero in the fine level are automatically given a value of zero in the coarse level. By not reprocessing the coefficients that have been quantized to zero, the amount of computation required for re-quantizing a region is considerably reduced. According to an embodiment of the present invention, when re-quantizing a region from coarse to fine, the coefficients quantized to zero will remain zero.

The frame analyzer unit 310, tessellation unit 320, bit allocation unit, quantizer selection unit 340, and budget analyzer unit 350 may be implemented using any known circuitry or technique. According to an embodiment of the present invention where the coding control unit 250 is implemented in hardware, the frame analyzer unit 310, tessellation unit 320, bit allocation unit, quantizer selection unit 340, and budget analyzer unit 350 all reside on a single semiconductor substrate.

Figure 6:
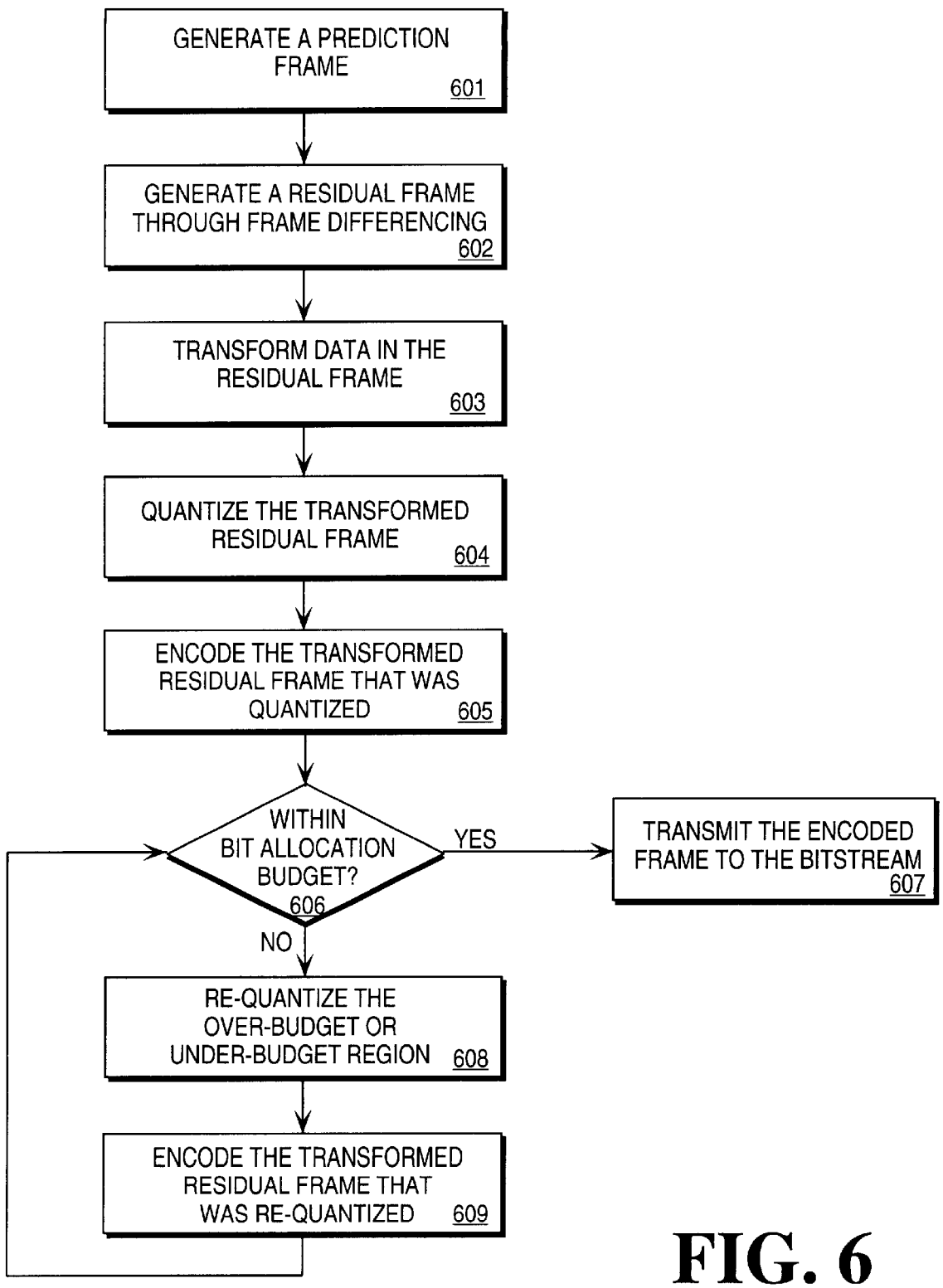
FIG. 6 is a flow chart that illustrates a method for encoding image data according to an embodiment of the present invention.

FIG. 6 is a flow chart that illustrates a method for encoding a frame of data according to an embodiment of the present invention. At step 601, a prediction frame is generated for a present frame to be encoded. According to an embodiment of the present invention, the prediction frame generated by performing motion estimation and motion compensation. Motion estimation is performed on the present frame to be encoded and regions of a frame previously received to be encoded. Motion vectors that define how images in the frame previously received are to be displaced in order to construct the regions of the present frame are generated. Motion compensation is performed on the present frame to be encoded by generating a prediction frame with the motion vectors and the frame previously received.

At step 602 frame differencing is performed on the frame to be encoded. According to an embodiment of the present invention, a residual frame that describes the difference between the prediction frame and the present frame to be encoded.

At step 603, data in the residual frame is transformed from a time domain to a frequency domain. According to an embodiment of the present invention, data in the residual frame is transformed using a discrete cosine transform (DCT).

At step 604, the transformed residual frame is quantized using an initial quantizer. According to an embodiment of the present invention, the initial quantizer is chosen based on historical data.

At step 605, the transformed residual frame that was quantized is encoded using a run length encoding algorithm.

At step 606, the amount of bits required for encoding each region in the transformed residual frame is counted. If the amount of bits required for encoding each of the regions meets the bit allocation budget, control proceeds to step 607. If the amount of bits required for encoding a region exceeds its bit allocation budget, control proceeds to step 608.

At step 607, the encoded frame bit stream is transmitted.

At step 608, the over-budget or under-budget region is re-quantized using another quantization level.

At step 609, the transformed residual frame that was re-quantized is encoding using a run length encoding algorithm. Control proceeds to step 606.

Figure 7:
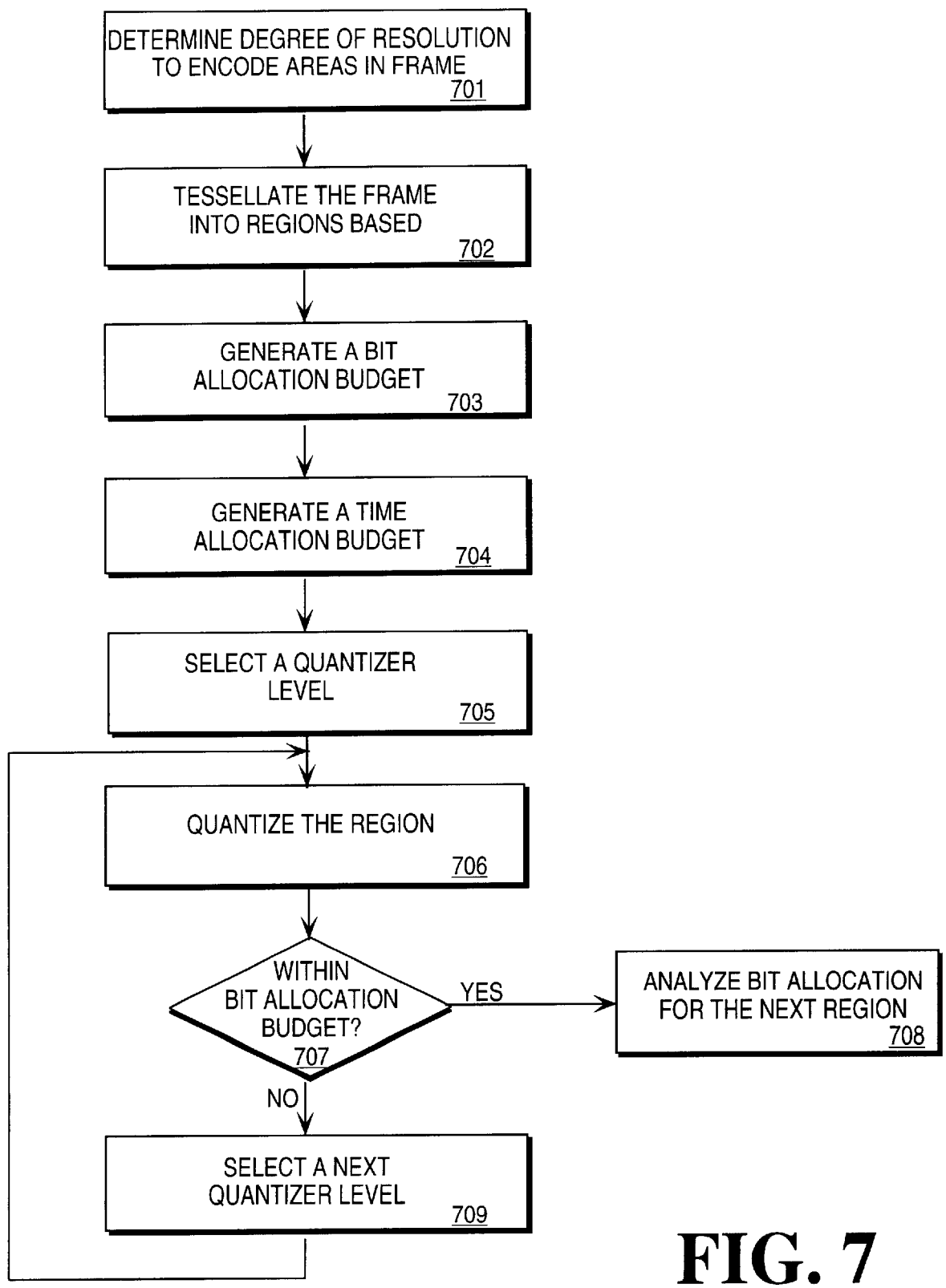
FIG. 7 is a flow chart that illustrates a method for processing image data according to an embodiment of the present invention.

FIG. 7 is a flow chart illustrating a method for processing image data of a frame to be encoded according to an embodiment of the present invention. At step 701, a degree of interest to encode areas in the frame to be encoded is determined. The degree of interest may be determined by analyzing motion activity in frames previous to the frame to be encoded, programmed preferences, or a combination of the two.

At step 702, the frame to be encoded is tessellated into a plurality of regions based on the degree of interest to encode the areas in the frame.

At step 703, a bit allocation budget is generated for the plurality of regions based on the degree of interest to encode the areas in the frame.

At step 704, a time allocation budget is generated for the plurality of regions for quantizing each region.

At step 705, a quantizer level is selected for quantizing each level based on bit allocation budget and the size of the region.

At step 706, the region is quantized with the selected quantizer level.

At step 707, it is determined whether an amount of bits required for encoding the region after quantizing the region with the selected quantizer level is within the bit allocation budget. If the amount of bits required for encoding the region is within the bit allocation budget or if the time allocation budget has expired, control proceeds to step 708. If the amount of bits required for encoding the region is not within the bit allocation budget and the time allocation budget has not expired, control proceeds to step 709.

At step 708, analyze the bit allocation for a next region.

At step 709, a quantizer level is selected for re-quantizing the region in response to how much the amount of bits required for encoding the region after quantizing the region with the previously selected quantizer level is outside the bit allocation budget. According to an embodiment of the present invention, a quantizer level is selected from a dynamic table created either from historical data or from a dynamic source model. Control proceeds to step 706.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than a restrictive sense.

What is claimed is:

1. A method for processing image data, comprising:
quantizing a region in a frame with an initial quantizer level;

determining whether an amount of bits required for encoding the region after quantizing the region with the initial quantizer level is within a bit allocation budget; and re-quantizing the region if the amount of bits is not within the bit allocation budget, said re-quantizing the region including quantizing the region with a second quantizer level, and image data in the region previously quantized to zero using the initial quantizer are given a value of zero and are not quantized with the second quantizer level.

2. A computer-readable medium having stored thereon a sequence of instructions, the sequence of instructions including instructions which, when executed by a processor, cause the processor to perform:

quantizing a region in a frame with an initial quantizer level;

determining whether an amount of bits required for encoding the region after quantizing the region with the initial quantizer level is within a bit allocation budget; and re-quantizing the region if the amount of bits is not within the bit allocation budget said re-quantizing the region including quantizing the region with a second quantizer level, and image data in the region previously quantized to zero using the initial quantizer are given a value of zero and are not quantized with the second quantizer level.

3. A coding control unit, comprising:

a budget analyzer unit that determines whether an amount of bits required to encode a region in a frame that has been quantized using an initial quantizer level is within a bit allocation budget;

a quantizer unit, coupled to the budget analyzer unit, that selects a subsequent quantizer level to re-quantize the region in the frame in response to how much the amount of bits required to encode the region after the region has been quantized using the initial quantizer level is outside the bit allocation budget;

frame analyzer unit that receives frames to be encoded and determines a degree of interest to encode areas in the frame; and a tessellation unit, coupled to the frame analyzer unit, that tessellates the frames to be encoded into regions based on the degree of interest to encode areas in the frame.

4. The coding control unit of claim 3, further comprising a bit allocation unit, coupled to the tessellation unit, that generates the bit allocation budget of how many bits may be used to encode each region based on the degree of interest to encode areas in the frame.

5. The coding control unit of claim 4, wherein the bit allocation unit generates a time allocation budget for quantizing each region.

6. A computer system, comprising:

a bus;

a processor coupled to the bus;

a video camera, coupled to the bus, the generates a frame of image data; and a coding control unit, coupled to the bus, that includes:
  a budget analyzer unit that determines whether an amount of bits required it encode a region in the frame that has been quantized using an initial quantizer level is within a bit allocation budget;
  a frame analyzer unit that receives frames to be encoded and that determines a degree of interest to encode areas in the frame;
  a quantizer unit, coupled to the budget analyzer unit, that selects a subsequent quantizer level to re-quantize the region in the frame in response to how much the amount of bits required to encode the region after the region has been quantized using the initial quantizer level is outside the bit allocation budget; and
  a tessellation unit, coupled to the frame analyzer unit, that tessellates the frames to be encoded into regions based on the degree of interest to encode areas in the frame.

7. The computer system of claim 6, further comprising a bit allocation unit, coupled to the tessellation unit, that generates the bit allocation budget of how many bits may be used to encode each region based on the degree of interest to encode areas in the frame.

8. The computer system of claim 7, wherein the bit allocation unit generates a time allocation budget for quantizing each region.

* * * * *